United States Patent [19]
Tilley et al.

[11] Patent Number: 5,198,127
[45] Date of Patent: Mar. 30, 1993

[54] MOULD

[75] Inventors: Gregory C. Tilley, Warilla; John Hanna, Strathfield West, both of Australia

[73] Assignee: Anchieta Pty. Limited, Strathfield West, Australia

[21] Appl. No.: 662,912

[22] Filed: Mar. 1, 1991

[30] Foreign Application Priority Data

Mar. 2, 1990 [AU] Australia .................................. PJ8888

[51] Int. Cl.⁵ .................................................. B28B 7/24
[52] U.S. Cl. ........................................ 249/92; 220/529; 220/552; 249/120; 249/124; 249/131; 249/132; 426/421; 426/515
[58] Field of Search ................ 249/85, 92, 93, 119, 249/120, 121, 124, 131, 132; 426/91, 101, 95, 134, 249, 421, 515; 220/528, 529, 552, 909; 425/126.1, 126.2, 436 RM, DIG. 219, DIG. 247

[56] References Cited

U.S. PATENT DOCUMENTS

| D. 192,225 | 2/1962 | Coleman | 426/134 |
| 1,912,505 | 6/1933 | Weston | 220/552 |
| 1,987,945 | 1/1935 | Schnaier | 249/92 |
| 2,819,690 | 1/1958 | Baker | 249/92 |
| 2,903,127 | 9/1959 | Dorman | 220/552 |
| 3,001,381 | 9/1961 | Frei | 426/515 |
| 3,373,890 | 3/1968 | Schilling | 220/552 |
| 4,316,595 | 2/1982 | Wheeler et al. | 249/96 |

Primary Examiner—Jay H. Woo
Assistant Examiner—W. J. Matney, Jr.

[57] ABSTRACT

A mould for ice confectionery and the like, including a removeable core for insertion into a cup. The core includes a number of core formers and a retainer for supporting handle strips, and closely engages the cup to define a number of mould segments.

7 Claims, 6 Drawing Sheets

MOULD

BACKGROUND OF THE INVENTION

1. Field of the Invention

The present invention relates to moulds and in particular to moulds for freezing water, confectionery, ice confectionery and the like.

The invention has been developed primarily for use with water and ice confectionery and will be described hereinafter with reference to such materials. However, it will be appreciated that the invention is not limited to this particular field of use.

2. Description of the Prior Art

In the past, freezing of water and confectionery was limited to ice block trays and single containers with a separate stick handle for removal of the ice and frozen confectionery from the container. However, such methods of making ice blocks and confectionery required the purchase of the appropriate trays and containers. Acknowledging the increased public consciousness with regard to recycling, the Applicant has devised an apparatus that is capable of moulding ice and confectionery but in its preferred form uses a recyclable cup as part of the mould.

It is an object of the present invention to overcome or substantially ameliorate the problems associated with conventional methods of making ice and confectionery.

SUMMARY OF THE INVENTION

According to the invention there is provided a mould for ice confectionery including a cup for receiving a removeable core, the core being closely engageable with the cup to define a plurality of mould segments, the core including a plurality of core formers and a retainer for supporting corresponding handle strips for the mould segments.

In accordance with a further aspect of the invention there is provided a removeable core for use with a cup to define an ice confectionery mould, the core when closely engaged with the cup defining a plurality of mould segments, the core including a plurality of core formers and a retainer for supporting corresponding handle strips for the mould segments.

In accordance with yet a further aspect of the invention there is provided a kit of parts for assembly into a removeable core for use with a cup to define an ice confectionery mould, the kit including:

a plurality of core formers each including mutually interengagable assembly formations for assembling the formers into a predetermined form for close engagement with the cup to define a plurality of mould segments;

a retainer including locking formations for engaging the formers and holding them in the predetermined form, said retainer also including means for supporting corresponding handle strips for the mould segments.

Preferably, the core formers include mutually interengagable assembly formations for assembling the formers into a predetermined form for close engagement with the cup and the retainer includes locking formations for engaging the formers and holding them in the predetermined form. At least one of the formers preferably incorporates an outwardly projecting handle. The retainer may include a plurality of holding slots for the handle strips and the handle strips correspond to each mould segment.

Preferably, the core formers are planar sheets with longitudinal side walls tapered for conformity with the cup and the sheets include a recess for receiving and locating the retainer.

DESCRIPTION OF THE PREFERRED EMBODIMENT

Figure 1:
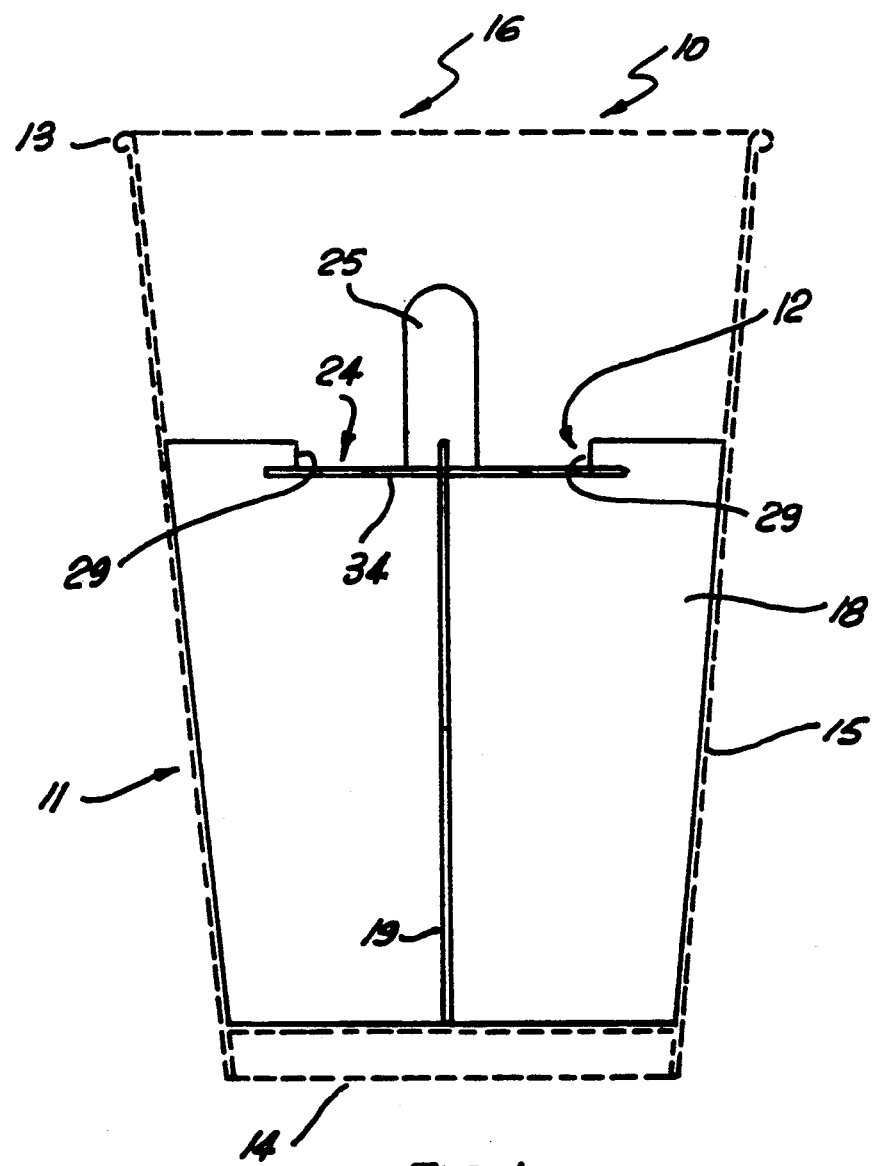
FIG. 1 is a sectional side view of a confectionery mould according to the invention.
Figure 2:
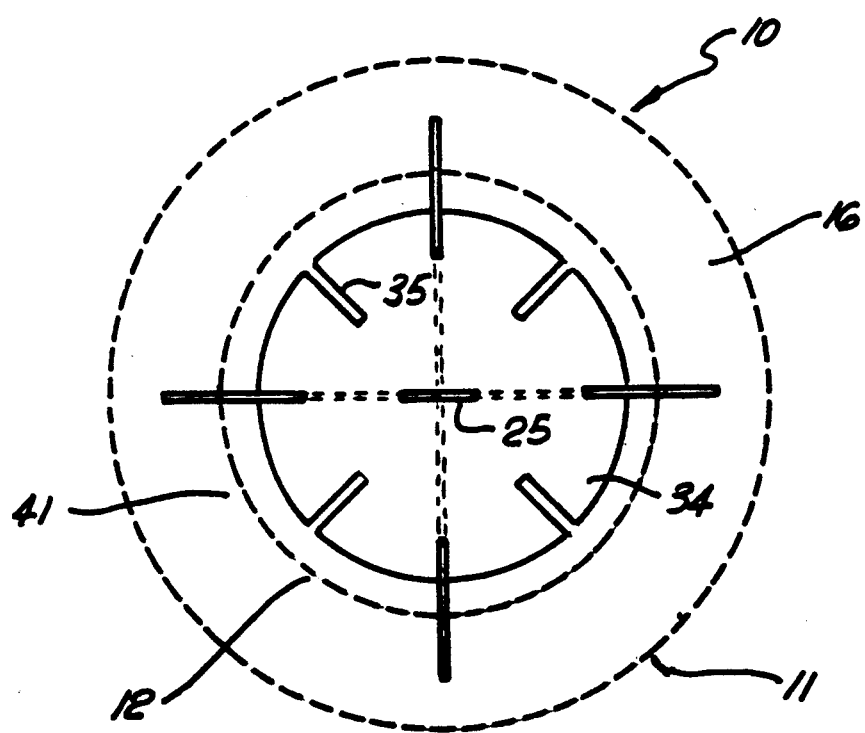
FIG. 2 is a plan view of the confectionery mould shown in FIG. 1.
Figure 3:
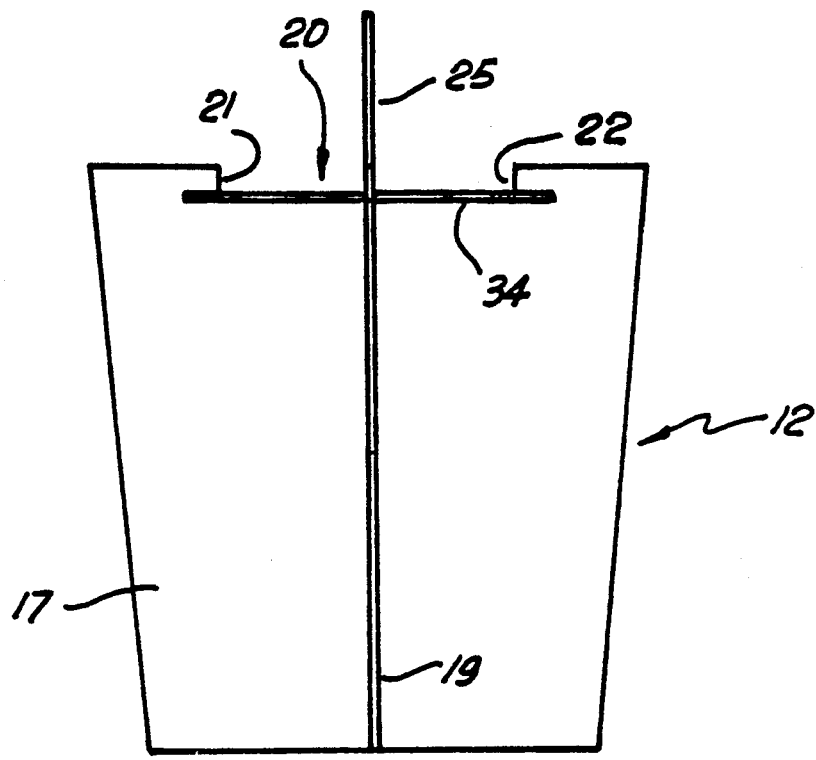
FIG. 3 is a side view of a removeable core according to the invention.
Figure 4:
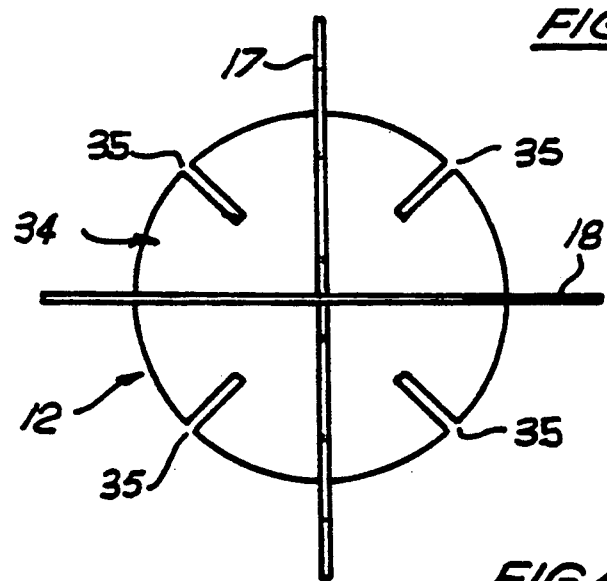
FIG. 4 is a plan view of the removeable core shown in FIG. 3.
Figure 5:
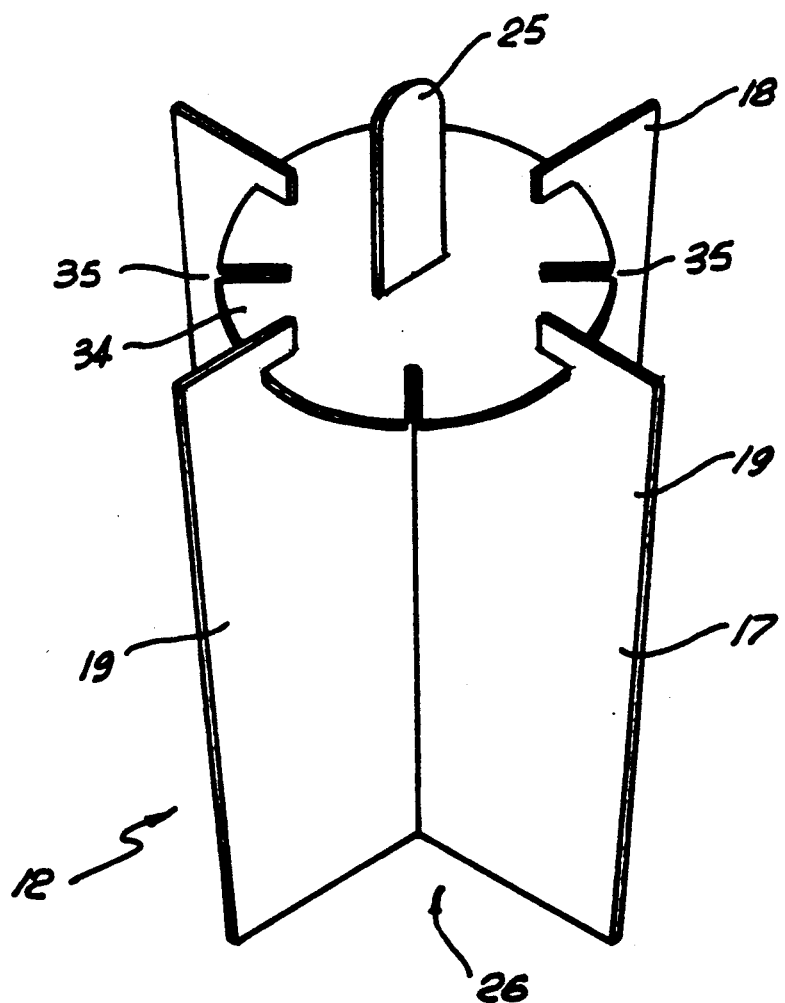
FIG. 5 is a perspective view of the core of FIG. 3.
Figure 6:
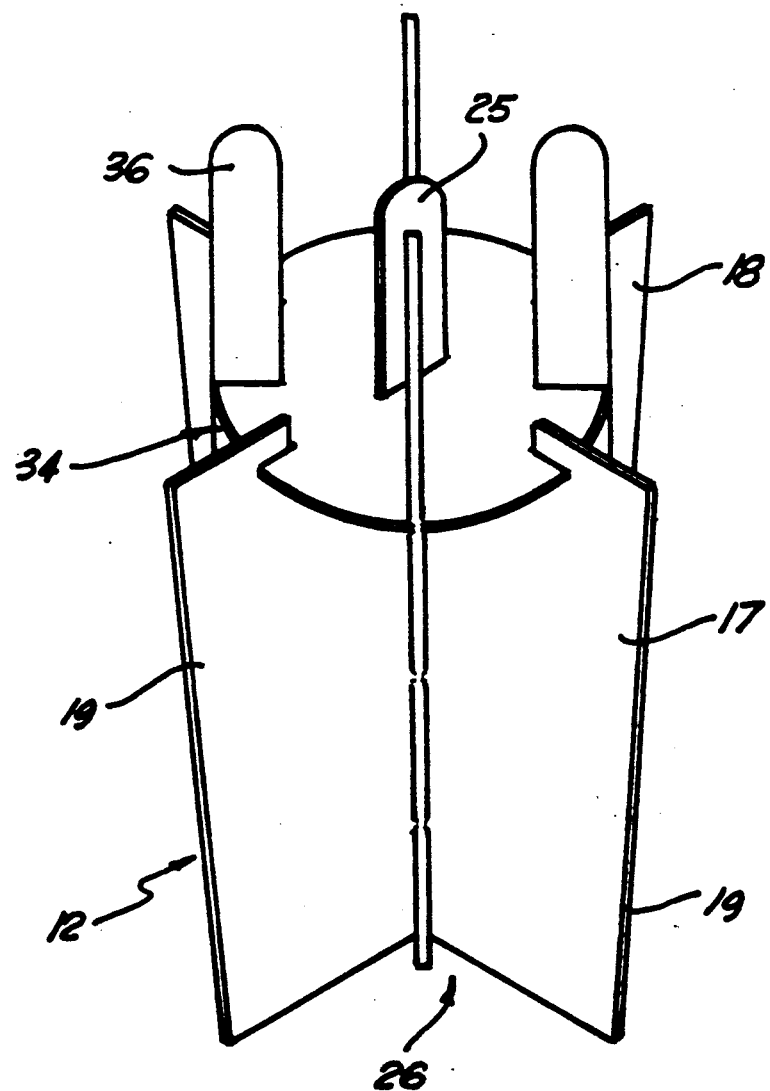
FIG. 6 is a perspective view of the core shown in FIG. 5 including corresponding handle strips.
Figure 7:
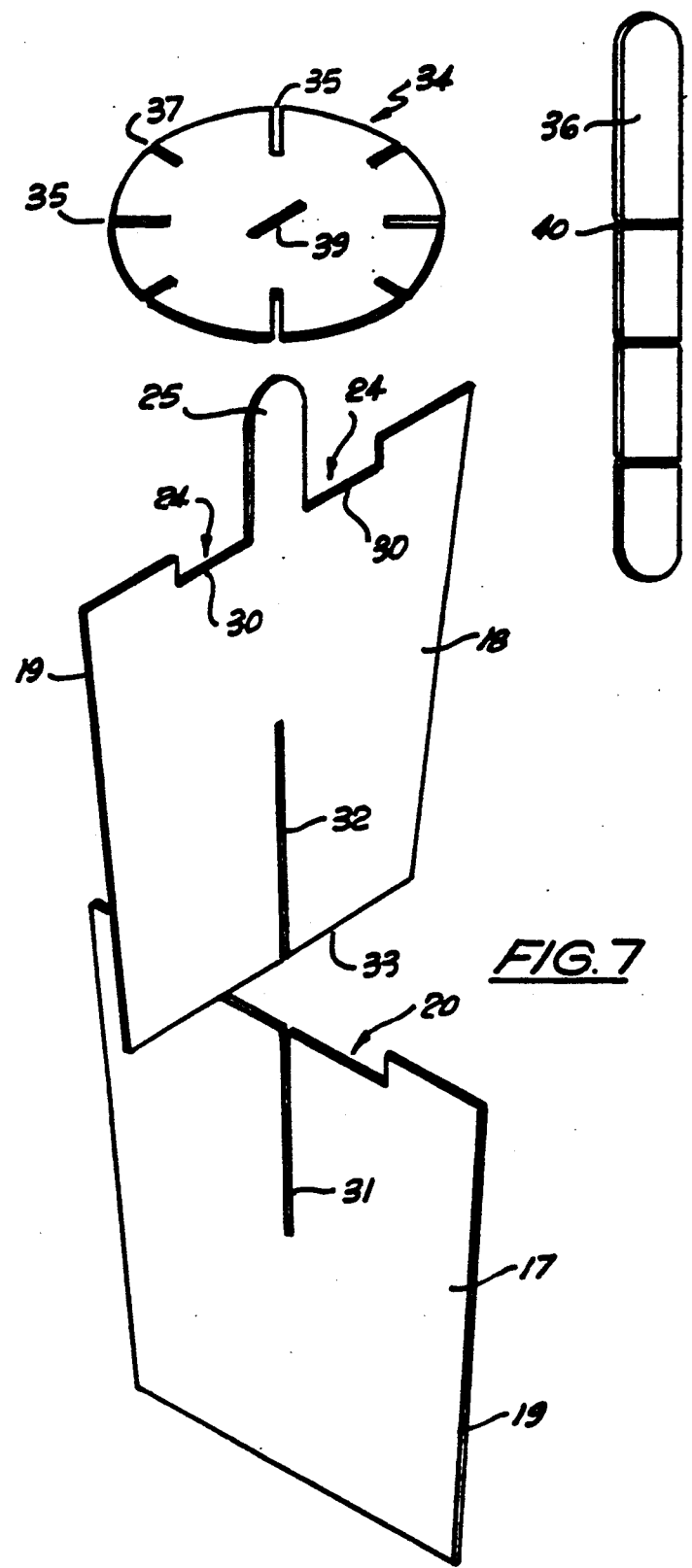
FIG. 7 is an exploded perspective view of the core shown in FIG. 3 with a corresponding handle strip.

Referring to the drawings, the confectionery mould 10 includes a cup 11 for receiving a removeable core 12. The cup includes a base 14 and a wall 15 extending upwardly and outwardly from the base, ending in a reinforcing rim 13 to define an opening 16. The core includes two core formers in the form of planar sheets 17 and 18 with longitudinal side walls 19 tapered for conformity with the cup wall 15. The spaces between the sheets define mould segments 26.

The sheet 17 includes a recess 20 defined by opposing vertical edges 21 and 22 and connecting horizontal edge 23. The second sheet 18 has a corresponding double recess 24 divided by an upwardly projecting handle 25. The sheets 17 and 18 include respective longitudinal slots 31 and 32 extending substantially midway along each sheet. The slots enable the sheets to be assembled as shown.

The core 12 also includes a retainer 34 for securing the sheets in their assembled position. The retainer further includes slots 35 for supporting corresponding handle sticks 36 for the mould segments 26. The retainer 34 is substantially circular, with the slots 35 spaced equidistantly around its circumference. The retainer 34 also includes a further four rectangular slots 37 also spaced equidistantly around its circumference to retain sheets 17 and 18 in their assembled position. During assembly, the handle 25 passes through a slot 39 centrally located in the retainer 34.

In use, the core is assembled and positioned within the cup 11. The sticks 36 are placed into slots 35 and a settable or freezable liquid poured into the cup to a level below the level of the retainer and slightly above grooves 40 located on the sticks 36. The grooves 40 are intended to provide a firmer engagement between the solidified confectionery and the sticks 36.

Desirably, the cup is a recyclable paper cup as used in fast food outlets. The core and sticks may be made of any suitable material such as plastics.

Although the invention has been described with reference to specific examples, it will be appreciated by those skilled in the art that the invention may be embodied in many other forms.

We claim:

1. A confectionery mould including a removable core, and a cup for receiving the removable core, the core being closely engageable with the cup to define a plurality of mould segments, the core including a plurality of core formers and a retainer for supporting handle strips, wherein each strip corresponds to a different mould segment, the core formers being planar sheets with side walls conforming with said cup, and at least one of the core formers incorporating a handle which projects upwardly away from the core former that incorporates such handle, and the handle being positioned substantially midway along such core former so that, during assembly of the core formers with the retainer, the handle passes through a handle slot which is centrally located in the retainer.

2. A removable core for use with a cup to define a confectionery mould, the core when closely engaged with the cup defining a plurality of mould segments, the core including a plurality of core formers and a retainer for supporting handle strips wherein each strip corresponds to a different mould segment, the core formers being planar sheets with side walls conforming with said cup, and at least one of the core formers incorporating a handle which projects upwardly away from the core former that incorporates such handle, and the handle being positioned substantially midway along such core former so that, during assembly of the core formers and the retainer, the handle passes through a handle slot which is centrally located in the retainer.

3. A kit of parts for assembly into a removable core for use with a cup to define a confectionary mould, said kit including:

a plurality of core formers each including mutually interengageable assembly formations for assembling the formers into a predetermined form for close engagement with the cup to define a plurality of mould segments;

a retainer including locking formations for engaging the formers and holding said formers in the predetermined form, said retainer also including means for supporting handle strips wherein each strip corresponds to a different mould segment, the core formers being planar sheets with side walls conforming with said cup, and at least one of the core formers incorporating a handle which projects upwardly away from the core former that incorporates such handle, and the handle being disposed to project substantially midway along such core former so that, during assembly of the core formers with the retainer, the handle passes through a handle slot which is centrally located in the retainer.

4. A device according to claim 1 or claim 2, wherein said core formers include mutually interengagable assembly formations for assembling the formers into a selected form for close engagement with the cup.

5. A device according to claim 4, wherein said retainer includes locking formations for engaging the formers and holding said formers in the selected form.

6. A device according to any one of claim 1 to claim 3, wherein said retainer includes a plurality of holding slots for the handle strips.

7. A device according to claim 1, wherein said sheets include a recess for receiving and locating said retainer.

* * * * *